SINGLE CRYSTAL PHOTOCONDUCTING PHOTOCELLS AND METHODS OF PREPARATION THEREOF

Filed May 1, 1957 2 Sheets-Sheet 1

INVENTORS
RICHARD H. BUBE &
SOREN M. THOMSEN

BY J. C. Whittaker
ATTORNEY

INVENTORS
RICHARD H. BUBE &
SOREN M. THOMSEN
BY
J. L. Whittaker
ATTORNEY 2,916,678
Patented Dec. 8, 1959

2,916,678

SINGLE CRYSTAL PHOTOCONDUCTING PHOTOCELLS AND METHODS OF PREPARATION THEREOF

Richard H. Bube, Belle Meade, and Soren M. Thomsen, Pennington, N.J., assignors to Radio Corporation of America, a corporation of Delaware

Application May 1, 1957, Serial No. 656,744

16 Claims. (Cl. 317—237)

This is a continuation-in-part of U.S. patent applications, Serial No. 349,661, filed April 20, 1953 and Serial No. 438,684. filed June 23, 1954 by Richard H. Bube and Soren M. Thomsen, both now abandoned.

This invention relates to single crystal electrical devices and to improved methods of producing cadmium sulphide and cadmium selenide crystals for use in said devices.

Cadmium sulphide and cadmium selenide crystals can be produced in a variety of ways. One method is to react cadmium metal in gaseous form with a gas containing sulphur or selenium at a temperature below the sublimation temperature of the reaction product, and allowing crystals of the reaction product to grow in the region where the reaction takes place. Another method is to sublime already formed cadmium sulphide or cadmium selenide and then to crystallize the vapor under controlled conditions.

The electrical conductivity and photosensitivity of cadmium sulphide or cadmium selenide crystals, made by any of the previously known methods, varies from batch to batch and from crystal to crystal. Electrical conductivity refers to the ability of a crystal to pass an electric current, and is used in this application as defined by the AIEE in "Definitions of Electrical Terms" approved August 12, 1941. This conductivity, when measured for an illuminated crystal, is referred to as the light conductivity of the crystal; and when measured for the same crystal in darkness is referred to as the dark conductivity of the crystal. As used in this application, the photosensitivity of the crystal, is the change of conductivity per unit of light intensity present.

Since the dark and light conductivity and photosensitivity normally vary from crystal to crystal, and from batch to batch, it is desirable to provide a method for producing cadmium sulphide and cadmium selenide crystals with uniform and predetermined conductivities and photosensitivities.

An object of this invention is to provide improved methods for producing improved cadmium sulphide and cadmium selenide crystals for use in electrical devices.

Another object is to provide improved methods for producing crystals of cadmium sulphide and cadmium selenide having a predetermined photosensitivity.

Another object is to provide uniformly conducting crystals of cadmium sulphide and cadmium selenide.

Another object is to provide improved cadmium sulphide and cadmium selenide photoconducting crystals.

Another object is to provide improved single crystal photoconducting photocells.

Another object is to provide improved electrical devices, each including a single, discrete crystal of cadmium sulphide or cadmium selenide having predetermined electrical conductivities.

Cadmium sulphide and cadmium selenide crystals grown in an atmosphere including a halogen-containing gas may have both compensated and uncompensated halogen incorporated therein. Uncompensated halogen refers to halogen which substitutes for sulphur (or selenium) in the crystals and increases the conductivity of the crystals. Each uncompensated halogen atom provides one electron which is free at room temperature. The increase in conductivity is due to the one free electron supplied by each atom of uncompensated halogen. Compensated halogen refers to halogen which substitutes for sulphur (or selenium) in the crystals and does not change the conductivity of the crystals. In this case, all of the electrons associated with the halogen are captured; for example, by other impurities such as copper and silver ions, or by crystal imperfections. These captured electrons are strongly bound and not easily ionized.

This invention is based on the fact that cadmium sulphide and cadmium selenide crystals prepared by vapor phase techniques have a limited tolerance for uncompensated halogen which depends upon the partial pressure of the halogen-containing gas in the atmosphere and the temperature at which the process is carried out. In this invention, an excess of halogen-containing gas is provided in all cases, so that the crystals contain as much uncompensated halogen as they can tolerate under the preparation conditions. The crystals so produced contain a substantially uniform proportion of uncompensated halogen and therefore have substantially uniform electrical conductivity and photosensitivity.

The methods of the invention comprise producing uniformly conducting cadmium sulphide and cadmium selenide crystals by introducing the maximum proportion of halogen which the crystals will tolerate. Thereafter, the conductivity of the crystals may be reduced to a desired value by introducing into the crystals a controlled proportion of a metal selected from the group consisting of silver and copper. The metal compensates a portion of the previously uncompensated halogen, imparting the desired conductivities and photosensitivity to the crystals.

The invention includes also processes for modifying the spectral response of the aforementioned crystals of cadmium sulphide by annealing the crystals in a selenium-containing atmosphere. By such processes, crystals are produced having a spectral sensitivity intermediate between that of pure cadmium sulphide crystals and pure cadmium selenide crystals.

The invention provides also improved electrical devices comprising two electrodes in contact with a single crystal prepared by the method of the invention and containing more than $10^{-10}$ parts by weight uncompensated halogen per million parts of crystal.

The novel features of the invention, are set forth in greater detail in the following description in conjunction with the accompanying drawings, in which.

INCORPORATION OF HALOGEN IONS

Crystals containing a maximum proportion of uncompensated halogen may be prepared by including an excess of a halogen-containing gas in the ambient atmosphere during the growth of the crystals.

Figure 1:
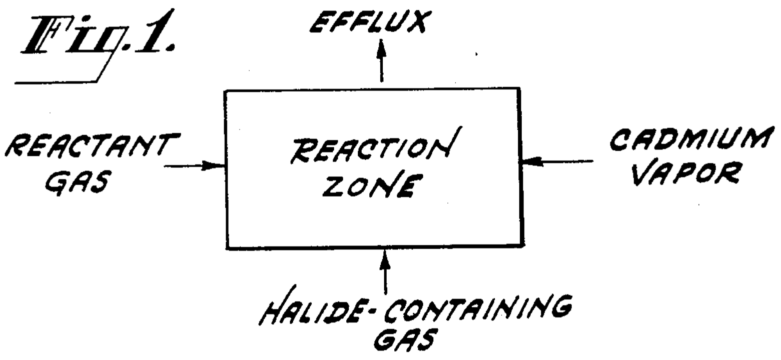
Figure 1 is a schematic diagram illustrating a general method for producing uniformly conducting cadmium sulphide or cadmium selenide crystals by reaction in the vapor state.
Figure 2:
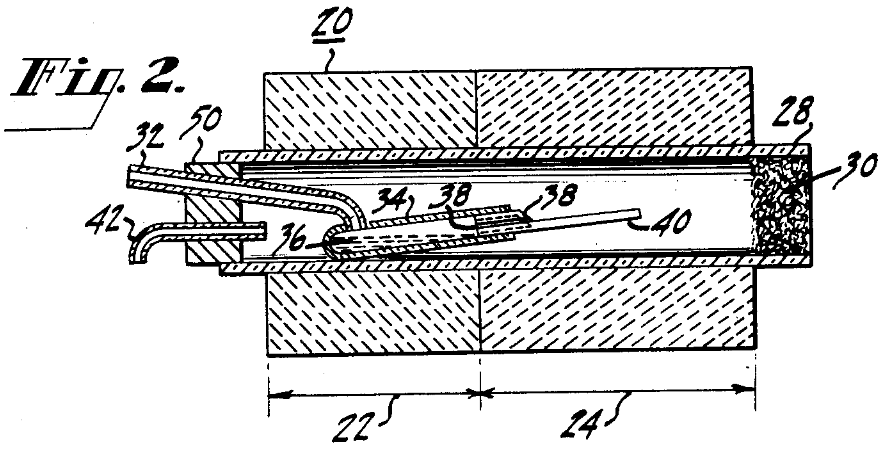
Figure 2 is an elevational sectional view of an apparatus for producing crystals having halogen ions incorporated therein by reaction in the vapor state.

*Example 1.*—Figure 2 illustrates an apparatus that may be used to produce conducting cadmium sulphide crystals using the present invention. The general method and apparatus for growing crystals of cadmium sulphide and cadmium selenide is fully described in application of Richard H. Bube and Soren M. Thomsen, Serial No. 345,086, filed March 27, 1953, now abandoned. The process is conducted, for example, in a horizontal silica furnace tube 28, that is about 2 inches at its outer diameter and about 42 inches long. The furnace tube 28 is heated by a two-zone furnace 20 outside and extending along the length of the tube 28. The two zones, a metal vaporizing zone 22 and a reaction zone 24 are indicated in Figure 2 by different cross hatching. The furnace 20 may be heated by any convenient method. The end of the furnace tube 28 nearest the metal vaporizing zone 22 is closed by a plug 50. This plug may be made of any suitable material. A reactant gas inlet tube 42 extends through the plug 50 into the furnace tube 28.

A holder 34 for metallic cadmium is located within the furnace tube 29. The holder 34 preferably is a test tube about ¾ inch outside diameter and about 6 inches long. The closed end of the holder 34 rests on the bottom of the furnace tube 28 in the metal vaporizing zone 22. The open end of the holder 34 is raised about ½ inch above the closed end of the holder 34 and lies in the reaction zone 24. A carrier gas inlet tube 32 extending from outside the furnace tube 28 through the plug 50 is attached to the top side of the holder 34 near the closed end thereof.

One or more nozzles 38 and a rod 40 are located in the open end of the holder 34. The nozzles 38 are tubes of any suitable diameter and length. The rod 40, for example, is about 18 inches long and also of a suitable diameter. The nozzles 38 and rod 40 are bunched so that they fit into the open end of holder 34. Nozzles 38 and rod 40 extend about 1½ inches into holder 34 and are held in place by friction when the tube is inclined. The carrier gas inlet tube 32, the metal holder 34, the nozzles 38 and the rods 40 are preferably made of a heat-resistant glass although any heat-resistant, chemically-inactive material may be used.

The end of the furnace tube 28 nearest the reaction zone 24 is closed with a loosely fitted glass wool plug 30. The plug 30 may be made of any porous material that will allow the passage of gases therethrough.

In operation, the holder 34 is charged with about 30 grams of cadmium metal. The purity of cadmium and the size of the charge are not critical. The size of the charge may vary, for example, from 10 to 60 grams, for the specific apparatus described. The nozzles 38 and rod 40 are then assembled in the holder 34 as described heretofore.

A stream of carrier gas is passed through the carrier gas inlet tube 32 over the cadmium metal charge in the holder 34 and emerges from the nozzles 38. The carrier gas is preferably helium, but other inert gases, for example, nitrogen, argon or neon may be used. Certain reducing gases, such as hydrogen, may be used. Mixtures of these gases may also be employed. The carrier gas flows at a rate, for example, of from 50 to 400 milliliters per minute. Two hundred milliliters per minute is the preferred rate of flow for the apparatus described.

In operation the furnace is brought up to temperature. The metal vaporizing zone 22 is maintained at 600° to 750° C., preferably about 650° C. The reaction zone 24 is maintained at 850° to 1000° C., preferably about 900° C. The metal holder 34 with nozzles 38 and rod 40 is next assembled in the furnace tube 28 as illustrated in Figure 2. The cadmium metal 36 melts and flows to the bottom of the metal holder 34.

A sulphur-containing reactant gas is bubbled through an aqueous hydrochloric acid solution having a concentration of 8 moles hydrogen chloride per liter or greater and is then passed through the reactant gas inlet tube 42 into the furnace tube 28. The reactant gas flows at a rate of 50 to 400 milliliters per minute, preferably at about 200 milliliters per minute. The reactant gas may be, for example, pure hydrogen sulphide or the hydrogen sulphide may be diluted with hydrogen or an inert gas. A flow rate of the reactant gas of 200 ml./min., gives an input into the reaction chamber of about $2.5 \times 10^{19}$ hydrogen chloride molecules per minute. The volume of the reaction chamber is about 515 $cm.^3$. The excess hydrogen chloride not incorporated into the crystals passes out the other end of the tube.

Figure 3:
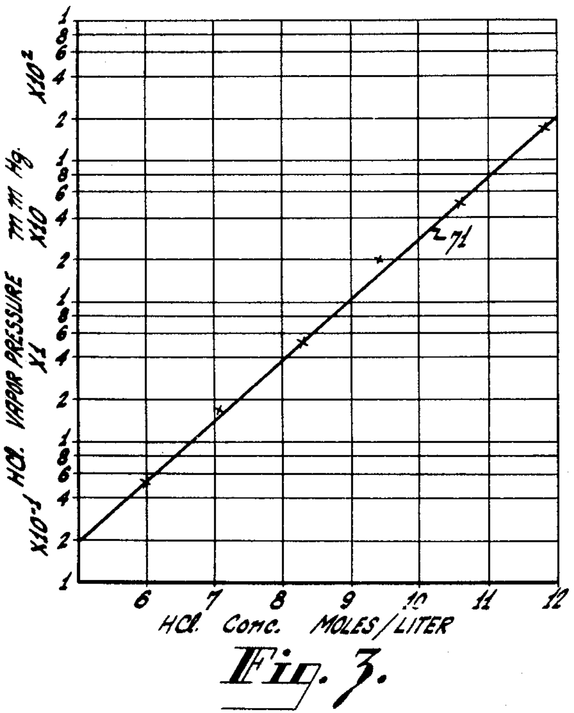
Figure 3 is a graph showing the vapor pressure of hydrogen chloride for various concentrations of hydrochloric acid at room temperature.

The hydrochloric acid may be any concentration that will give up hydrogen chloride to the reactant gas. The measured vapor pressure at room temperature of hydrogen chloride over the hydrogen chloride solution is given by the curve 71 in Figure 3, as a function of the solution concentration. Experimentally, it was found that conducting crystals were obtained for concentrations of 8 molar or greater, corresponding to hydrogen chloride vapor pressures of 4 mm. mercury or greater. Insulating crystals were obtained when the concentration was 6 molar, but increased photosensitivity indicates definite incorporation of chlorine. Alternative to bubbling the reactant gas through aqueous hydrochloric acid, gaseous hydrogen chloride may be mixed with the reactant gas in a proportion so that the partial pressure of hydrogen chloride in the mixture is 4 mm. of mercury or greater and then passed directly into the furnace tube 28 through the inlet tube 42.

The halogen-containing gas may be introduced into the furnace tube 28 through the carrier gas inlet tube 32. This may be accomplished by bubbling the carrier gas through aqueous hydrochloric acid as described above, or the hydrogen chloride may be mixed with the carrier gas directly. Other halogen-containing gases such as hydrogen bromide, hydrogen iodide, and methyl chloride may be mixed with the reactant gas or the carrier gas in place of hydrogen chloride. Chlorine, bromine or iodine may be mixed with the carrier gas in place of hydrogen chloride. Sources of bromine or iodine giving equivalent vapor pressures to those mentioned above would have similar effects.

The carrier gas, passing over the molten cadmium metal 36, picks up cadmium metal vapor and carries it through the nozzles 38 into the furnace tube 28 in the reaction zone 24. The cadmium metal vapor, on emerging from the nozzles 38, reacts with the sulphur-containing reactant gas in the atmosphere of the reaction zone 24 to form cadmium sulphide. The cadmium sulphide thus formed deposits at the ends of the nozzles 38 and on the rods 40 and on the walls of the furnace tube 28. The effluent gases pass down the furnace tube 28 through the glass wool plug 30 to an exhaust (not shown).

The reaction is allowed to continue until the cadmium metal 37 is consumed. When the cadmium metal is consumed, the reactant gas mixture is stopped but the carrier gas is allowed to continue to flow through the holder 34. The furnace tube 28 is removed from the furnace and allowed to cool for 30 minutes or more with the carrier gas flowing. When cooled, the carrier gas flow is stopped, the apparatus disassembled and the cadmium sulphide is removed.

The cadmium sulphide crystals produced according to Example 1 are electrically-conducting. There is also produced a small proportion of fine powder; and polycrystalline masses depending upon the temperatures of the zones and the rates of flow of the gases.

Figures 4, 6:
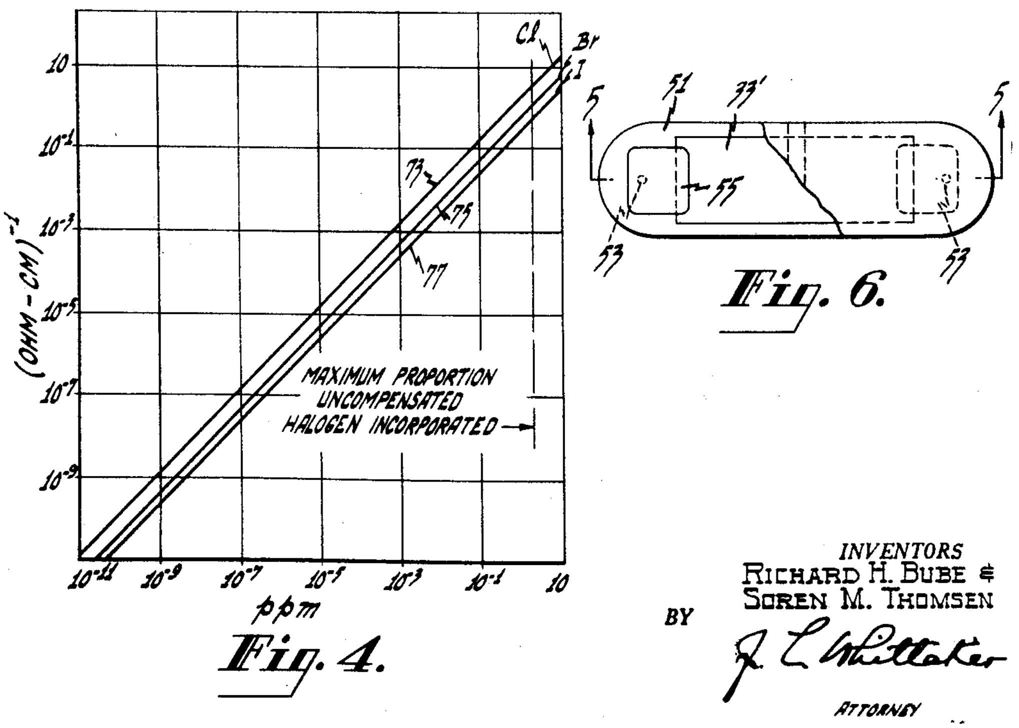
Figure 4 is a graph showing the effect of uncompensated halogen ions on the dark conductivity of a cadmium sulfide crystal.

The conducting crystals prepared in this way contain about one part per million by weight of incorporated chlorine uncompensated by acceptor impurities. The chlorine acts as a donor impurity with such a small activation energy (0.04 e.v.) that it is completely ionized at room temperature. Fig. 4 shows the variation of conductivity with varying proportions of uncompensated chlorine, bromine, and iodine by the curves 73, 75 and 77 respectively. The proportion of uncompensated chlorine in the crystals is determined electrically. Chemical analysis reveals only that the crystals contain less than 20 p.p.m. total halogen.

While there has been described a method for making conducting cadmium sulphide, conducting cadmium selenide may be prepared by the same general method. For example, in the foregoing detailed description, substituting a selenium-containing reactant gas such as hydrogen selenide, for the sulphur-containing reactant gas, produces conducting cadmium selenide crystals.

*Example 2.*—Follow the procedure of Example 1 except substitute hydrogen selenide for hydrogen sulphide.

*Example 3.*—Follow the procedure of Example 1 except pass the carrier gas instead of the hydrogen sulphide through the hydrochloric acid.

INCORPORATION OF COPPER OR SILVER

If it is desired to lower conductivity of the crystals, silver or copper is introduced into the crystals to produce the desired conductivity. One method for introducing silver or copper into crystals of cadmium sulphide includes immersing a weighed amount of cadmium sulphide crystals in an aqueous solution containing a known amount of copper or silver. The copper or silver replaces cadmium at the surface of the cadmium sulphide crystals. When the replacement is complete, the cadmium sulphide crystals are washed, dried and fired to a temperature sufficient to diffuse the copper or silver into the cadmium sulphide crystals. The above described method for reducing the conductivity of cadmium sulphide and cadmium selenide is more completely described in U.S. Patent 2,742,376 to Soren M. Thomsen, issued April 17, 1956.

*Example 4.*—In order to incorporate about 5 parts per million of copper into cadmium sulphide, the following procedure may be used: Immerse 6 grams of cadmium sulphide crystals as prepared in Example 3 in 50 ml. of 0.00001 molar aqueous copper nitrate solution. Agitate the mixture gently for 5 minutes, decant the liquid and wash the crystals twice in triple-distilled water. Dry the crystals in air below 150° C. then fire the crystals at about 700° C. for about 20 minutes in an atmosphere of hydrogen sulfide. Cool to a temperature below 150° C. in the same atmosphere before exposing to air. This will yield about 6 grams of cadmium sulphide containing about 5 parts per million of copper.

In the above described process, a solution of any soluble copper or silver salt of any concentration that will deposit a known amount of copper or silver on a known weight of cadmium sulphide or cadmium selenide may be used.

While hydrogen sulphide is given as the atmosphere in which to fire the crystals, inert gases, such as nitrogen, helium and argon; and certain reducing gases, such as hydrogen, or mixtures of these gases, are satisfactory. The temperature to which the material is heated is not critical. However, the temperature must be high enough to give the copper sufficient mobility to diffuse into the crystals of the material but not so high as to cause the materials to evaporate. About 700° C. is desirable for diffusing copper into cadmium sulphide, although temperatures between 550 and 900° C. may be used.

*Example 5.*—Follow the procedure of Example 4 except substitute the crystals prepared in Example 2 for the crystals prepared in Example 3.

*Example 6.*—Follow the procedure of Example 6 except substitute the crystals prepared in Example 1 for the crystals prepared in Example 3.

For each of the above mentioned crystals, a conductivity greater than $10^{-3}$ (ohm-cm.)$^{-1}$ is considered to be electrically-conducting. This would include conducting cadmium sulphide or cadmium selenide prepared by the processes of Examples 1, 2 or 3, containing less than about two parts by weight of copper or silver per million parts of cadium sulphide. Materials having a conductivity less than $10^{-10}$ (ohm-cm.)$^{-1}$ are considered to be insulating. This would include conducting cadmium sulphide or cadmium selenide prepared by the processes of Examples 1, 2 or 3, containing more than about ten parts by weight of copper or silver per million parts of cadmium sulphide. Materials that have a conductivity between $10^{-10}$ and $10^{-3}$ (ohm-cm.)$^{-1}$ have an intermediate conductivity with a relatively high photosensitivity and include conducting cadmium sulphide or cadmium selenide prepared by the processes of Examples 1, 2 or 3, containing about two to ten parts by weight of copper or silver per million parts of cadmium sulphide.

Crystals prepared by the processes of the foregoing examples but without any impurity have a low conductivity and a low photosensitivity. Table I gives the data showing the effects on the resistivity caused by incorporating (1) chlorine and (2) chlorine and copper in the crystals.

The decay time for the photocurrent is also very dependent on the presence of impurity. The decay time for the "pure" cadmium sulphide crystals may be as small as a fraction of a millisecond, whereas the decay time for conducting crystals containing halogen may be as large as 100 milliseconds.

*Table I*

DEPENDENCE OF RESISTIVITY ON IMPURITY

| Impurity added | Dark resistivity, ohm cm. | Light resistivity, ohm cm.[a] |
|---|---|---|
| None | $10^{12}$ | $10^{8}$ |
| Chlorine[b] | $4\times10^{-1}$ | $4\times10^{-1}$ |
| Chlorine plus following p.p.m. Cu[c]: | | |
| 1 | 20 | 17 |
| 2 | 70 | 50 |
| 4 | $10^{7}$ | $3\times10^{3}$ |
| 10 | $10^{8}$ | $5\times10^{3}$ |

[a] For 9 foot candle incandescent illumination.

[b] Proportion of chlorine ions incorporated under conditions where crystals may incorporate all the chlorine possible during their growth.

[c] Total weight of copper in the solution with which the crystals were treated; not necessarily the proportion of copper incorporated. There is no change in resistivity in dark or light for proportions of copper greater than 10 p.p.m. for this type of treatment.

The properties of crystals (1) without impurities, (2) with halogen impurity, and (3) with halogen and copper impurities are discussed in more complete detail by Richard H. Bube and Soren M. Thomsen in the Journal of Chemical Physics, vol. 23, No. 1, January 1955, pages 15 to 17 and by Richard H. Bube in the Journal of Chemical Physics, vol. 23, No. 1, January 1955, pages 18 to 25.

MODIFYING SPECTRAL RESPONSE

A cadmium sulphide crystal prepared by the foregoing processes exhibits maximum photosensitivity to green light, in the range between about 5000 and 5200 A. For many device applications, it is desirable for the crystal to exhibit photosensitivity to red light or to red and green light. Cadmium selenide exhibits a maximum photosensitivity to red light in the range between 7000 and 7200 A. However, certain of the properties of cadmium selenide crystals are less desirable for many purposes than are those of cadmium sulphide.

The spectral response of cadmium sulphide crystals is modified by heating crystals thereof in an atmosphere containing selenium. Such crystals are more sensitive to red radiation. A complete description of a preferred embodiment of this method will now be given.

*Example 7.*—About 0.5 gm. of selenium is placed in the bottom of a 1" x 8" test tube and covered with a body of ceramic cotton, such as "Fiberfrax." About 0.25 gm. of photoconductive cadmium sulphide crystals are placed on top of the ceramic cotton. The cadmium sulphide crystals may be prepared by the method of Example 1 or of Example 3.

The test tube is provided with a stopper having an inlet tube and an outlet tube therethrough. Hydrogen gas is passed into the test tube through inlet tube to flush out all the air contained therein. A small flow of hydrogen, about 20 ml. per minute, is then maintained throughout the subsequent firing and cooling steps of the process. The efflux from the tube is allowed to escape through outlet tube. The test tube is heated in a furnace at about 700° C. for about 12 minutes and then removed from the furnace and allowed to cool. The photoconductive body produced is ready for mounting in a device.

Before treatment, the cadmium sulphide crystals exhibit a peak spectral response at about 5200 A. After treatment, the crystals exhibit two peaks, one at about 5200 A. and one at about 7000 A.

In the process of Example 7, selenium atoms are substituted for some or all of the sulphur atoms in a layer near the surface of the original crystal. The proportion of selenium atoms substituted for sulphur atoms is a function of the ratio of Se to CdS, and the time and temperature of firing. The proportion of selenium atoms substituted for sulphur atoms decreases continuously with increasing distances from the surface of the crystal. Generally, the higher the ratio of Se to CdS, the greater the proportion of selenium substituted for sulphur.

The photoconducting crystal, prepared according to the process of Example 7, is believed to consist of a crystal of cadmium sulphide having a layer of cadmium sulphoselenide surrounding the cadmium sulphide, the cadmium sulphoselenide and cadmium sulphide being in a single crystal structure. It is believed that electrons, excited by light in the outer layer of the photoconducting crystal, are able to move freely throughout the crystal. In a polycrystalline body, the free flow of electrons is retarded by barriers which may exist at the crystal interfaces.

While a response in the range 7000 to 7200 A. is obtained from cadmium selenide crystals, there are advantages to cadmium sulphide crystals treated with selenium. First, it is possible to obtain a spectral response intermediate between cadmium sulphide and cadmium selenide crystals. Second, the desirable properties of cadmium sulphide may be retained while extending the spectral response of the photoconductive bodies. And, third, silver paste electrodes attached to cadmium sulphide crystals treated with selenium according to the invention are ohmic and exhibit relatively low noise characteristics. Silver paste electrodes attached to either cadmium sulphide or cadmium selenide are non-ohmic and therefore exhibit non-linear electric characteristics at low voltages, and also exhibit relatively high noise characteristics.

While a hydrogen atmosphere is described in Example 9, other atmospheres such as nitrogen, helium and argon may be used. The rates of flow of hydrogen gas during the process may be varied between 0 and 50 ml. per minute but preferably about 20 ml. per minute.

The firing temperature may be between about 500° C. and 900° C., but is preferably at about 700° C. Likewise, the firing time may be varied between 10 and 20 minutes, but preferably about 12 minutes. The firing temperature and firing time is determined by the rate of diffusion of the reactants and the volatility of the materials. Too high a temperature and too long a firing results in a loss of the materials by volatilization. Too low a temperature and too short a firing results in poor substitution of selenium for sulphur.

Table II gives the compiled data of cadmium sulphide crystals treated according to the method of Example 7, wherein varying ratios of selenium with respect to cadmium sulphide are used in the process of Example 7. The higher the ratio of Se/CdS, the greater the substitution of Se for S in the crystal.

*Table II*

| Curve | Ratio, Se/CdS | Sensitivity Peaks |
|---|---|---|
| 41 | 0 | 5,150 A. |
| 43 | 1 | 5,150, 6,500 A. |
| 45 | 2 | 5,220, 7,000, 7,200 A. |
| 47 | 5 | 7,320 (Flat response between 4,000 and 7,000 A. with about 20% of peak sensitivity). |

The composition of the crystal near the surface thereof may be inferred from the location of the sensitivity peaks. Thus, a 5150 A. peak corresponds to pure cadmium sulphide, and a 7300 A. peak corresponds to pure cadmium selenide. Intermediate peaks correspond to compositions where cadmium selenide has substituted for part of the cadimum sulphide. The amount of displacement of the sensitivity peak is a linear function of the amount of substitution of cadmium selenide for cadmium sulphide. Thus, a peak of 6100 A. corresponds to a composition comprising about equal parts of cadmium sulphide and cadmium selenide.

A photocell may be prepared according to the invention by contacting two electrodes to a photosensitive crystal of the invention.

DEVICES

Figure 5:
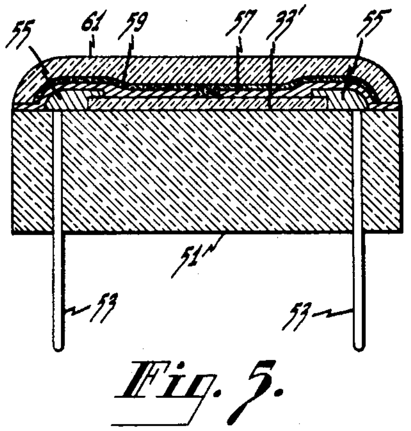
Figures 5 and 6 are a plan and a sectional elevational view respectively of a photocell of the invention.

*Example 8.*—Referring to Figures 5 and 6, a photocell may be prepared using the photoconducting crystals of the invention. Provide a plastic base 51 with two metal leads 53 therethrough. Place a crystal 33', prepared according to the method of Example 4, on the face of the base 51 and then place a drop of silver paste 55 at either end of the body. Place a mask of the proper width, preferably about 0.025", across the center of the body and evaporate indium metal over the face of the assembly. There is produced thereby a pair of indium electrodes 57 extending over the entire body 33' and silver paste drops 55 except for the gap produced by the mask.

Remove the mask and coat a thin layer of coil dope 58 over the face of the assembly. Then superimpose a layer 61 of transparent plastic such as an ethoxyline resin, for example, Araldite, over the layer of coil dope 59. The completed assembly is now ready for use as a photoconductor device.

While the device has been described with respect to the crystals prepared according to the method of Example 4, the device may be prepared with any photoconducting body of the invention containing between $10^{-10}$ and $10^{-3}$ parts uncompensated halogen per million parts crystal. Similarly, other physical structures may be provided in place of the structure described in Figures 5 and 6 without departing from the spirit of the invention. In principle, the device comprises a photoconducting body prepared according to the invention and a pair of electrodes attached thereto.

*Example 9.*—Prepare a photocell according to Example 8 except substitute a crystal prepared according to Example 5 in place of the crystal prepared according to Example 4.

A broad area rectifier may also be prepared according to the invention by contacting an ohmic and a rectifying electrode to a crystal of the invention containing more than $10^{-3}$ parts uncompensated halogen per million parts crystal. It is preferred to use crystals containing more than $10^{-3}$ parts by weight uncompensated halogen per million parts of crystal.

*Example 10.*—A broad area rectifier comprises a crystal prepared according to Example 3 and an indium and a silver electrode attached thereto. A piece of indium metal is suitably shaped by any of the commonly known methods, for example, casting, rolling, punching and stamping. A surface of the shaped indium so formed is pressed against a surface of the crystal of cadmium sulphide prepared according to Example 3 so that the two surfaces are in intimate physical contact with each other to form the ohmic electrode. In order to facilitate physical contact between surfaces, the indium may be warmed for a fraction of a minute in a non-oxidizing atmosphere. A drop of silver paste is suitably shaped and then pressed against the opposite side of the crystal to form a rectifying electrode 33. Suitable lead wires for the electrodes are attached by usual methods. This general type of rectifier is more fully described in U.S. patent application 317,179, filed May 25, 1953 by Roland W. Smith, now U.S. Patent No. 2,854,611.

*Example 11.*—Prepare a rectifier according to Example 10 except substitute a crystal prepared according to Example 2 for the crystal prepared according to Example 3.

What is claimed is:

1. The process of making electrically-conducting crystals of a material selected from the group consisting of cadmium sulphide and cadmium selenide which process comprises reacting cadmium vapor with a gas containing an element from the group consisting of sulphur and selenium, and then growing crystals of the reaction product in the presence of a controlled proportion of a halogen-containing gas.

2. The process of making electrically-conducting crystals of cadmium sulphide which comprises reacting cadmium vapor with gaseous hydrogen sulphide and then growing crystals of the reaction product in the presence of a controlled proportion of gaseous hydrogen chloride at a temperature maintained between 850 and 1000° C.

3. The process of making electrically-conducting crystals of cadmium selenide which comprises reacting cadmium vapor with gaseous hydrogen selenide and then growing crystals of the reaction product in the presence of a controlled proportion of gaseous hydrogen chloride at a temperature maintained between 850 and 1000° C.

4. The process of making cadmium sulphide crystals having a high photosensitivity which comprises reacting cadmium vapor with gaseous hydrogen sulphide, growing crystals of the reaction product in the presence of a controlled proportion of gaseous hydrogen chloride at a temperature maintained between 850 and 1000° C., subsequently, immersing the crystallized product in an aqueous solution containing a controlled amount of copper as copper nitrate of about $10^{-7}$ to about $10^{-5}$ molar concentration, washing said crystals, drying said crystals, and then heating said crystals at about 700° C. in an atmosphere of hydrogen sulphide.

5. The process of making cadmium selenide crystals having a high photosensitivity which comprises reacting cadmium vapor with a selenium-containing gas, growing crystals of the reaction product in the presence of a controlled proportion of gaseous hydrogen chloride at a temperature maintained between about 850 and 1000° C., subsequently immersing the crystallized reaction product in an aqueous solution containing a controlled amount of copper as copper nitrate of about $10^{-7}$ to about $10^{-5}$ molar concentration, washing said crystals, drying said crystals, and then heating said crvstals at about 700° C. in an atmosphere of hydrogen sulphide.

6. An electrical device comprising two electrodes in contact with a crystal of cadmium sulphide, said crystal containing between $10^{-10}$ to $10^{-3}$ parts by weight of uncompensated halogen per million parts cadmium sulphide.

7. An electrical device comprising two electrodes in contact with a crystal of cadmium sulphide, said crystal containing $10^{-10}$ to $10^{-3}$ parts by weight of uncompensated halogen and 2 to 7 parts of a metal selected from the group consisting of copper and sliver per million parts cadmium sulphide.

8. An electrical device comprising two electrodes in contact with a crystal of cadmium sulphide, said crystal containing between $10^{-10}$ and $10^{-3}$ parts uncompensated chlorine and 2 to 7 parts copper per million parts cadmium sulphide.

9. An electrical device comprising two electrodes in contact with a crystal of cadmium selenide, said crystal containing between $10^{-10}$ to $10^{-3}$ parts by weight uncompensated halogen per million parts cadmium selenide.

10. An electrical device comprising two electrodes in contact with a crystal of cadmium selenide, said crystal containing $10^{-10}$ to $10^{-3}$ parts uncompensated halogen and 2 to 7 parts of a metal selected from the group consisting of copper and silver per million parts cadmium selenide.

11. An electrical device comprising two electrodes in contact with a crystal of cadmium selenide, said crystal containing between $10^{-10}$ and $10^{-3}$ parts uncompensated chlorine ions and 2 to 7 parts copper per million parts cadmium selenide.

12. An electrical device comprising a pair of electrodes in contact with a crystal of cadmium sulphide, said crystal characterized by selenium atoms substituted for the sulphur atoms near the surface of said crystal and containing between $10^{-10}$ and $10^{-3}$ parts uncompensated halogen per million parts crystal.

13. An electrical device comprising a pair of electrodes in contact with a crystal of cadmium sulphide, said crystal characterized by selenium atoms substituted for sulphur atoms near the surface of said crystal and containing between $10^{-10}$ and $10^{-3}$ parts uncompensated halogen and 2 to 7 parts of a metal selected from the group consisting of copper and silver per million parts crystal.

14. An electrical device comprising a pair of electrodes in contact with a crystal of cadmium sulphide, said crystal characterized by selenium atoms substituted for sulphur atoms near the surface of said crystals and containing between $10^{-10}$ to $10^{-3}$ parts uncompensated halogen and 2 to 7 parts copper per million parts crystal.

15. An electrical device comprising two electrodes in contact with a crystal of cadmium sulphide containing between $10^{-10}$ and $10^{-3}$ parts by weight uncompensated chlorine per million parts cadmium sulphide.

16. An electrical device comprising two electrodes in contact with a crystal of cadmium selenide containing between $10^{-10}$ and $10^{-3}$ parts uncompensated chlorine per million parts cadmium selenide.

References Cited in the file of this patent

UNITED STATES PATENTS

| | | |
|---|---|---|
| 2,600,579 | Ruedy et al. | June 17, 1952 |
| 2,651,700 | Gans | Sept. 8, 1953 |
| 2,727,866 | Larach | Dec. 20, 1955 |
| 2,728,731 | Butler et al. | Dec. 27, 1955 |
| 2,810,052 | Bube et al. | Oct. 15, 1957 |